W. W. EDMISTEN.
RUBBER TIRE SETTING DEVICE.
APPLICATION FILED AUG. 7, 1906.
905,671.
Patented Dec. 1, 1908.
2 SHEETS—SHEET 2.
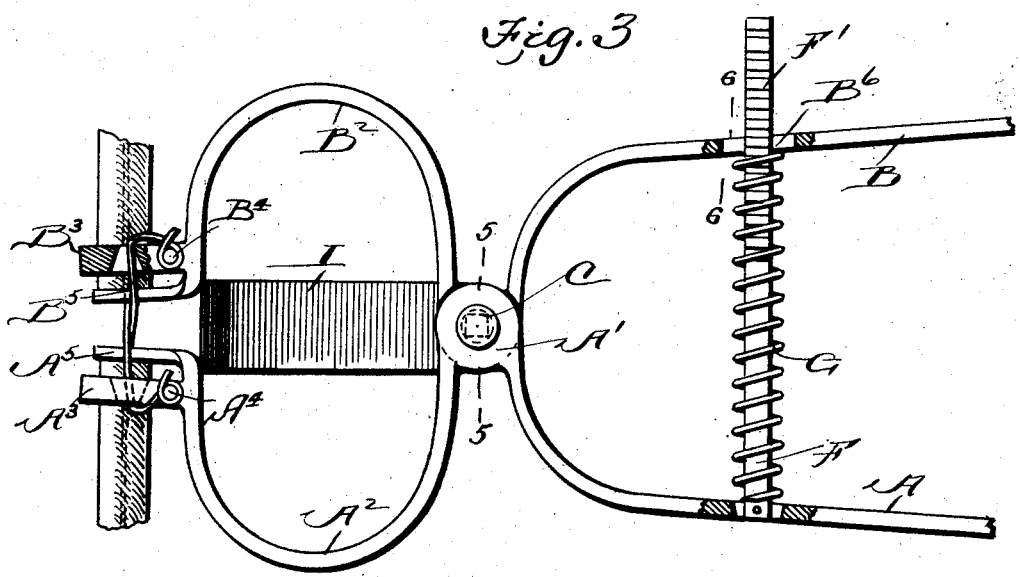
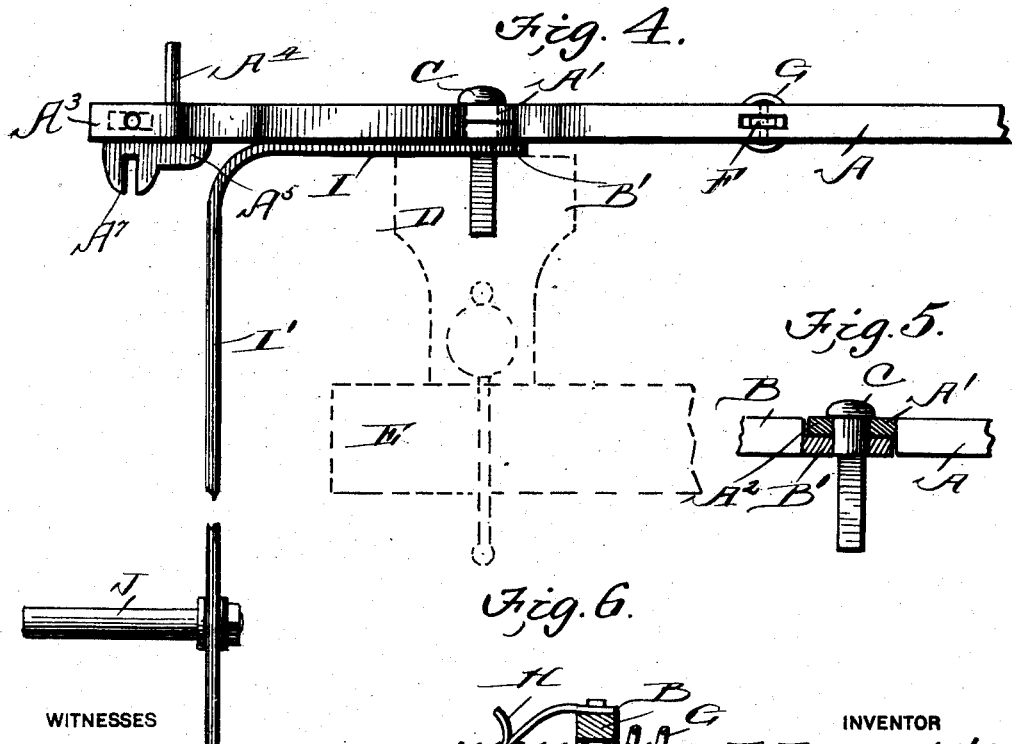
WITNESSES
INVENTOR
W. W. Edmisten.
ATTYS.

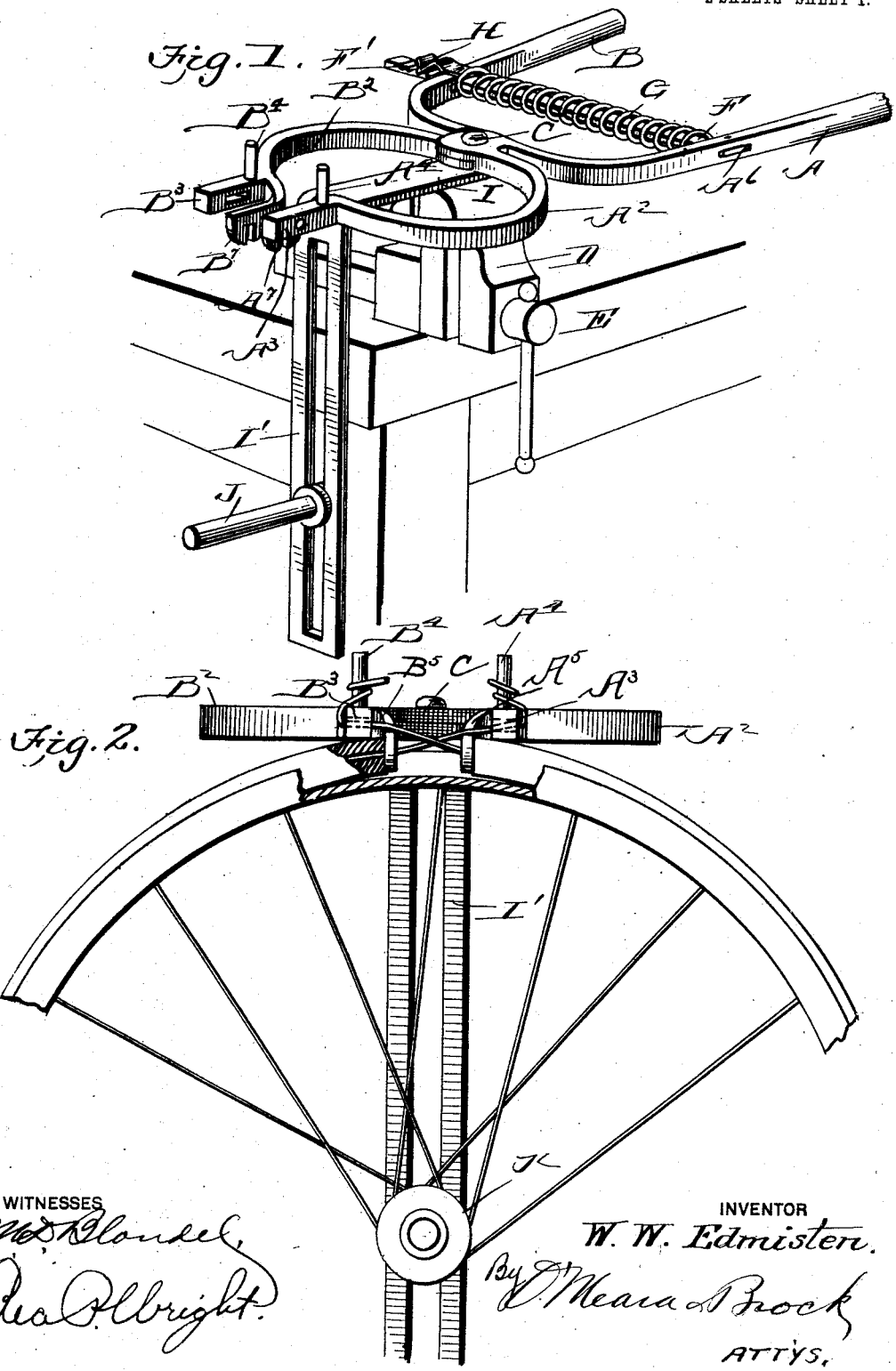

UNITED STATES PATENT OFFICE.

WILLIAM W. EDMISTEN, OF PENDLETON, OREGON.

RUBBER-TIRE-SETTING DEVICE.

No. 905,671.     Specification of Letters Patent.     Patented Dec. 1, 1908.

Application filed August 7, 1906. Serial No. 329,605.

*To all whom it may concern:*

Be it known that I, WILLIAM W. EDMISTEN, a citizen of the United States, residing at Pendleton, in the county of Umatilla and State of Oregon, have invented a new and useful Improvement in Rubber-Tire-Setting Devices, of which the following is a specification.

This invention relates to a device for putting rubber tires on wheels and especially to a device of this kind in which the ends of a wire passing through the tire are caught and drawn together, the ends of the rubber tire being forced apart at the same time so that the end portions of the wire can be twisted together.

Another object of my invention is to provide means for locking the jaws of the device while the ends of the wire are being twisted.

With these objects in view, the invention consists of the novel features of construction, hereinafter fully described and pointed out in the claims.

In the drawings forming a part of this specification:—Figure 1 is a perspective view of my improved device attached to a vise. Fig. 2 is an end view of my improved device showing a wheel attached and a tire being placed thereon. Fig. 3 is a top plan view of my improved device in use. Fig. 4 is a side elevational view of my improved device. Fig. 5 is a section taken on lines 5—5 of Fig. 3. Fig. 6 is a section taken on lines 6—6 of Fig. 3.

Referring to the drawings A and B indicate a pair of handles having flattened enlarged apertured portions A′ B′, pivotally connected together by a bolt C, having a square lower end which is adapted to be clamped in an ordinary vise D, secured to a table or bench E. Bowed jaws A², B², project outwardly from the portions A′, B′, provided with forwardly projecting apertured ends A³, B³, and having upwardly projecting pins A⁴, B⁴. The ends A³, B³, are provided with downwardly and forwardly projecting separating arms A⁵, B⁵, having bifurcated lips A⁷, B⁷, formed on their outer ends to fit over the wire of the tire, and also to hold the ends of the rubber tire apart. The handle A is provided with a slot A⁶, in which one end of a bar F is pivoted which is surrounded by a coil-spring G, and is provided with a notched end F′, adapted to work through a slot B⁶, in the handle and be engaged by a spring pawl H, carried by the handle B which hold the handle in any position desired. An angled plate I provided with a square opening adjacent one end is adapted to fit over the square portion of the bolt C the vertical portion of the plate being provided with a slot I′ in which the bolt J is slidably mounted, forming an axle on which the wheel K is adapted to be placed.

The operation of the device is as follows: The device being secured in a vise, a wheel is placed on the bolt J, which is adjusted vertically, so as to bring the rim of the wheel K, under the end of the jaws A², B². The rubber tire having a wire passing through it, is then placed on the wheel, the wires are then passed through the bifurcated lips of the arms and the apertured ends of the jaws and twisted around the pins A⁴, B⁴. The end portion of the wire passing through the lip A⁷, and end B³, is twisted around the pin B⁴, and the end portion of the wire passing through the arm B⁷ and the end A³, is twisted around the pin A⁴. The handles are then shoved together which will expand the jaws and draw the two ends of the wire together, and at the same time the arms will shove the rubber back, and the handle will be locked in this position by the bar and pawl, so that the ends of the wire can be secured together so that when the wire is released from the jaws the compressed ends of the rubber will expand and completely close the joint of the wire.

Having thus fully described my invention, what I claim as new and desire to secure by Letters Patent is:—

1. A device of the kind described comprising a vertically slotted angled plate, a pivoted bolt passing therethrough jaws pivotally mounted on said bolt and movable in a horizontal plane, operating handles connected to said jaws, means for locking said handles in position relative to each other, the said jaws being curved, the free end portions of said jaws being parallel and apertured, vertically arranged pins carried by said straight apertured end portions, and downwardly and inwardly extending arms carried by said jaws and arranged between the parallel end portions of the jaws, said arms being bifurcated, as and for the purpose set forth, and wheel supporting means adjustably carried by the angled plate and movable in the slot.

2. In a device of the kind described, the combination with a pair of handles provided with flattened enlarged portions pivotally connected together by a bolt having a square lower end, said handles being provided with
5 bowed jaws having apertured ends, wire securing members secured on said ends separating arms depending from said end, and a support carried by said bolt, for the purpose described.

WILLIAM W. EDMISTEN.

Witnesses:
H. C. CRAIG,
B. S. BURROUGHS.